(12) United States Patent
Hu

(10) Patent No.: US 10,894,573 B2
(45) Date of Patent: Jan. 19, 2021

(54) ELECTRIC POWER-ASSIST DRIVE ASSEMBLY FOR A SPOKED-WHEELED VEHICLE

(71) Applicant: Pengjie Hu, Edmonton (CA)

(72) Inventor: Pengjie Hu, Edmonton (CA)

(*) Notice: Subject to any disclaimer, the term of this patent is extended or adjusted under 35 U.S.C. 154(b) by 126 days.

(21) Appl. No.: 16/146,748

(22) Filed: Sep. 28, 2018

(65) Prior Publication Data

US 2019/0118902 A1     Apr. 25, 2019

Related U.S. Application Data

(60) Provisional application No. 62/565,026, filed on Sep. 28, 2017.

(51) Int. Cl.
| | | |
|---|---|---|
| *H02K 11/30* | (2016.01) | |
| *H02K 21/24* | (2006.01) | |
| *H02K 41/02* | (2006.01) | |
| *H02K 11/33* | (2016.01) | |
| *H02K 11/00* | (2016.01) | |
| *B62M 6/45* | (2010.01) | |
| *B62M 6/60* | (2010.01) | |
| *B60B 1/00* | (2006.01) | |

(52) U.S. Cl.
CPC ............. *B62M 6/45* (2013.01); *B62M 6/60* (2013.01); *H02K 11/30* (2016.01); *H02K 21/24* (2013.01); *H02K 41/02* (2013.01); *B60B 1/003* (2013.01); *B60L 2220/44* (2013.01); *H02K 11/0094* (2013.01); *H02K 11/33* (2016.01); *H02K 2201/15* (2013.01); *Y02T 10/64* (2013.01); *Y02T 10/70* (2013.01)

(58) Field of Classification Search
CPC .......... B62M 6/45; B62M 6/60; H02K 41/02; H02K 11/30; H02K 21/24; H02K 11/33; H02K 2201/15; H02K 11/0094; B60B 1/003
See application file for complete search history.

(56) References Cited

U.S. PATENT DOCUMENTS

| | | | | |
|---|---|---|---|---|
| 3,884,317 A | * | 5/1975 | Kinzel | .................... B60L 50/53 180/220 |
| 5,788,007 A | * | 8/1998 | Miekka | ................. B60L 3/0061 180/205.1 |
| 5,874,792 A | * | 2/1999 | Chen | .......................... B62J 6/12 310/268 |
| 6,486,582 B1 | * | 11/2002 | Patarchi | ................... H02K 7/14 310/12.12 |
| 6,492,756 B1 | * | 12/2002 | Maslov | ................... B60L 50/52 310/156.12 |

(Continued)

*Primary Examiner* — Michael C Zarroli

(57) ABSTRACT

An electric power-assist drive assembly for propelling a vehicle having a frame and at least one spoked wheel includes a rotatable driving ring supporting a plurality of magnets and mountable to the wheel; a stationary stator supporting a plurality of electromagnets and mountable to the frame proximate to the wheel for overlapping the electromagnets and the magnets; and a control assembly mountable to the frame, stator, or any part of the vehicle for delivering electric energy to the stator to rotate the driving ring; wherein rotation of the driving ring propels rotation of the wheel. A vehicle including the electric power-assist drive assembly and a method of propelling a vehicle using the electric power-assist assembly are included.

13 Claims, 8 Drawing Sheets

(56) References Cited

U.S. PATENT DOCUMENTS

| | | | | |
|---|---|---|---|---|
| 6,580,188 B2 * | 6/2003 | Katagiri | .................. | B60L 58/25 310/67 A |
| 8,222,789 B2 * | 7/2012 | Zhu | ..................... | H02K 21/026 310/209 |
| 10,023,264 B2 * | 7/2018 | Hayslett | ................... | B62M 6/40 |
| 2002/0100625 A1 * | 8/2002 | Beltrame | .............. | H02K 11/20 180/65.51 |
| 2004/0263099 A1 * | 12/2004 | Maslov | .................. | B60L 58/40 318/400.24 |
| 2010/0236849 A1 * | 9/2010 | Wishart | .............. | B60K 7/0007 180/65.51 |
| 2012/0215389 A1 * | 8/2012 | Perry | .................... | H02K 15/03 701/22 |

\* cited by examiner

ELECTRIC POWER-ASSIST DRIVE ASSEMBLY FOR A SPOKED-WHEELED VEHICLE

CROSS REFERENCE TO RELATED APPLICATION

This application claims the benefit of U.S. Provisional Patent Application Ser. No. 62/565,026, filed Sep. 28, 2017, which is hereby incorporated by reference in its entirety.

FIELD OF THE INVENTION

The present invention is directed to an electric power-assist drive assembly for a spoked-wheeled vehicle, particularly a bicycle.

BACKGROUND OF THE INVENTION

Bicycles are widely utilized for various purposes including for example, bicycle commuting to travel from home to a place of work or study; and utility cycling as a means of transport rather than as a sport or leisure activity in many countries such as, for example, China and the Netherlands. However, managing steep hills, fighting wind, or travelling lengthy distances on traditional pedal powered bicycles can readily fatigue the bicyclist and cause health problems such as knee pain or exercise induced asthma.

Various types of motorized bicycles in which the bicycle is propelled by a motor-driven friction wheel engaged with a tire of the bicycle are well known in the art. However, the motors are of the internal combustion type, and a heavy and bulky in relation to the mount power they develop. Additionally, they generate considerable noise and subject the user to toxic exhaust fumes. With the current emphasis on the control of air pollution and on the use of motors which do not release toxic vapors, there is a need for a self-propelled bicycle which does not release toxic exhaust fumes.

As alternatives to motorized bicycles, electrically-operated bicycles have been gaining popularity for being more environmentally friendly and cost effective since no licensing or insurance is required. However, electrically-operated bicycles can be complex and heavy, and fraught with battery problems including low quality cells or fires caused by cheap batteries due to overload. Further, electrically-operated bicycles include mechanical systems with software and electrical complexities which may be difficult for the user to handle, repair and replace.

Accordingly, there is a need in the art for improvements to electrically-operated bicycles.

SUMMARY OF THE INVENTION

The present invention relates to an electric power-assist drive assembly for a spoked-wheeled vehicle, particularly a bicycle. When installed on the spoked-wheeled vehicle, the drive assembly enables a user to propel the vehicle by supplementing or replacing the manual effort normally needed to operate the vehicle.

In one aspect, the invention comprises an electric power-assist drive assembly for propelling a vehicle comprising a frame and at least one spoked wheel, the power-assist drive assembly comprising:
  a rotatable driving ring supporting a plurality of magnets and mountable to the wheel;
  a stationary stator supporting a plurality of electromagnets and mountable to the frame proximate to the wheel for overlapping the electromagnets and the magnets; and
  a control assembly mountable to the frame, stator, or any part of the vehicle for delivering electric energy to the stator to rotate the driving ring;
  wherein rotation of the driving ring propels rotation of the wheel.

In one embodiment, the driving ring is ring-shaped and comprises an annular rim portion having a front surface and a hack surface, and defining a central opening.

In one embodiment, the magnets are disposed either within or on a front surface of the rim portion. In one embodiment, the magnets are disposed within at least a portion or the entirety of the rim portion. In one embodiment, the magnets are evenly distributed in a predetermined pattern within at least a portion or the entirety of the rim portion, with adjacent magnets or groups of magnets being oriented to have opposite polarities.

In one embodiment, the magnets are disposed on at least a portion or the entirety of the front surface of the rim portion. In one embodiment, the magnets are evenly distributed in a predetermined pattern on at least a portion or the entirety of the front surface of the rim portion, with adjacent magnets or groups of magnets being oriented to have opposite polarities.

In one embodiment, the back surface or the annular rim portion of the driving ring comprises fastening means for attaching the driving ring to spokes on the wheel. In one embodiment, the driving ring has a diameter less than the diameter of a rim of the wheel.

In one embodiment, the stator comprises a plate, mounting means, and a neck extending between the plate and the mounting means. In one embodiment, the plate is substantially curved and supports the plurality of electromagnets disposed either within or on a top surface of the plate. In one embodiment, the electromagnets are disposed within at least a portion or the entirety of the plate. In one embodiment, the electromagnets are evenly distributed within at least a portion or the entirety of the plate. In one embodiment, the electromagnets are disposed on at least a portion or the entirety of the top surface of the plate. In one embodiment, the electromagnets are evenly distributed on at least a portion or the entirety of the top surface of the plate.

In one embodiment, the mounting means removably attaches the stator to a portion of the frame of the vehicle proximate to the wheel. In one embodiment, the mounting means comprises a tubular coupling structure formed of a pair of semi-tubular clamp members adapted to fit around a tubular portion of the frame.

In one embodiment, the control assembly comprises a user controller, an electrical speed controller, a battery, and connection means to the stator, and is positioned on the frame to be within reach of a user.

In one embodiment, the vehicle comprises a bicycle.

In one embodiment, the driving ring is in the form of multiple separate pieces.

In another aspect, the invention comprises a vehicle comprising the above electric power-assist drive assembly. In one embodiment, the vehicle comprises a bicycle.

In yet another aspect, the invention comprises a method of propelling a vehicle comprising a frame and at least one spoked wheel using the above electric power-assist drive assembly comprising the steps of:
  mounting the driving ring supporting the plurality of magnets to the wheel;

mounting the stationary stator supporting the plurality of electromagnets to the frame proximate to the wheel to overlap the electromagnets and the magnets;

mounting the control assembly to the frame; and operating the control assembly to deliver electric energy to the stator to rotate the driving ring, wherein rotation of the driving ring propels rotation of the wheel.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF PREFERRED EMBODIMENTS

Figure 1:
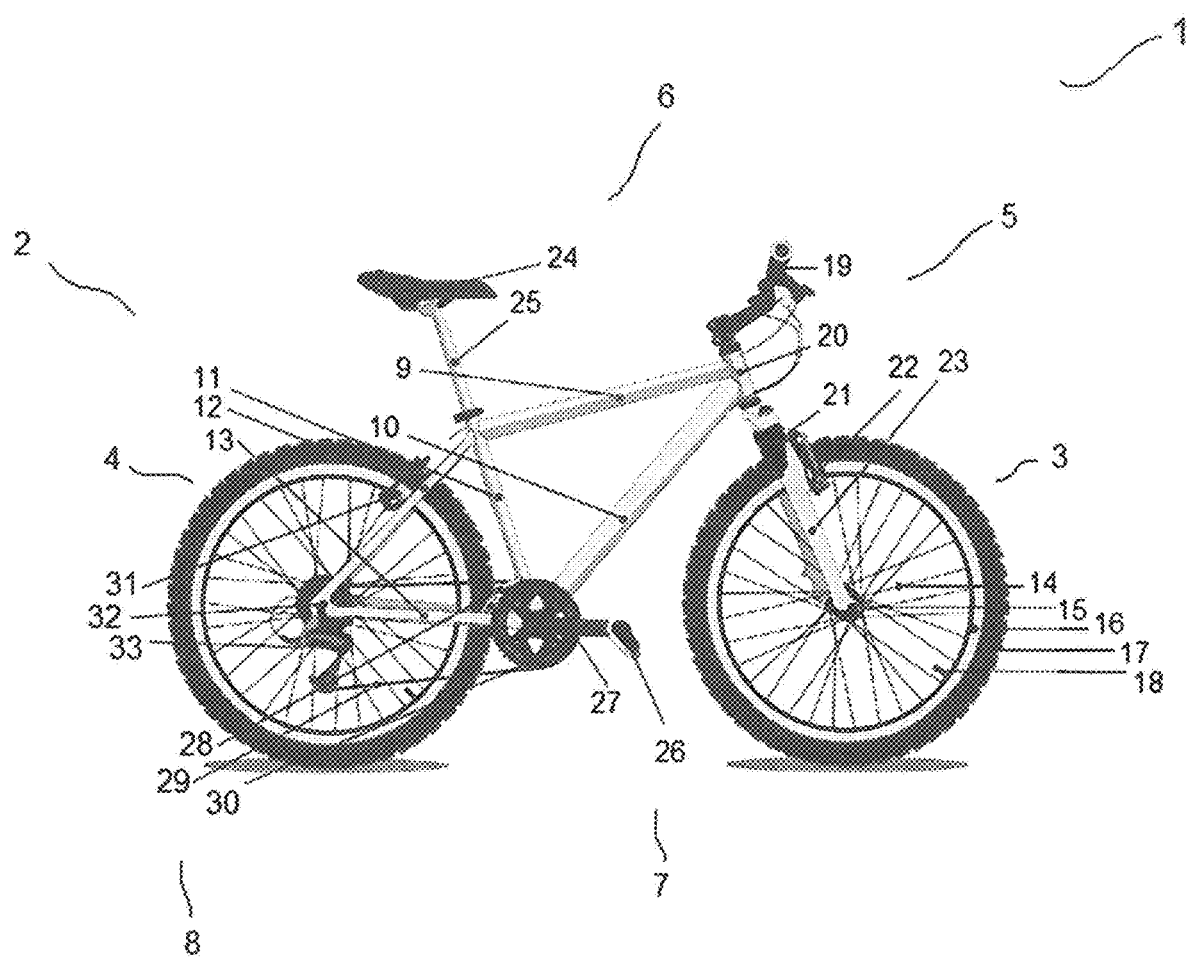
FIG. 1 (PRIOR ART) is a perspective view of a conventional, prior art bicycle for use with the present invention.
Figure 2:
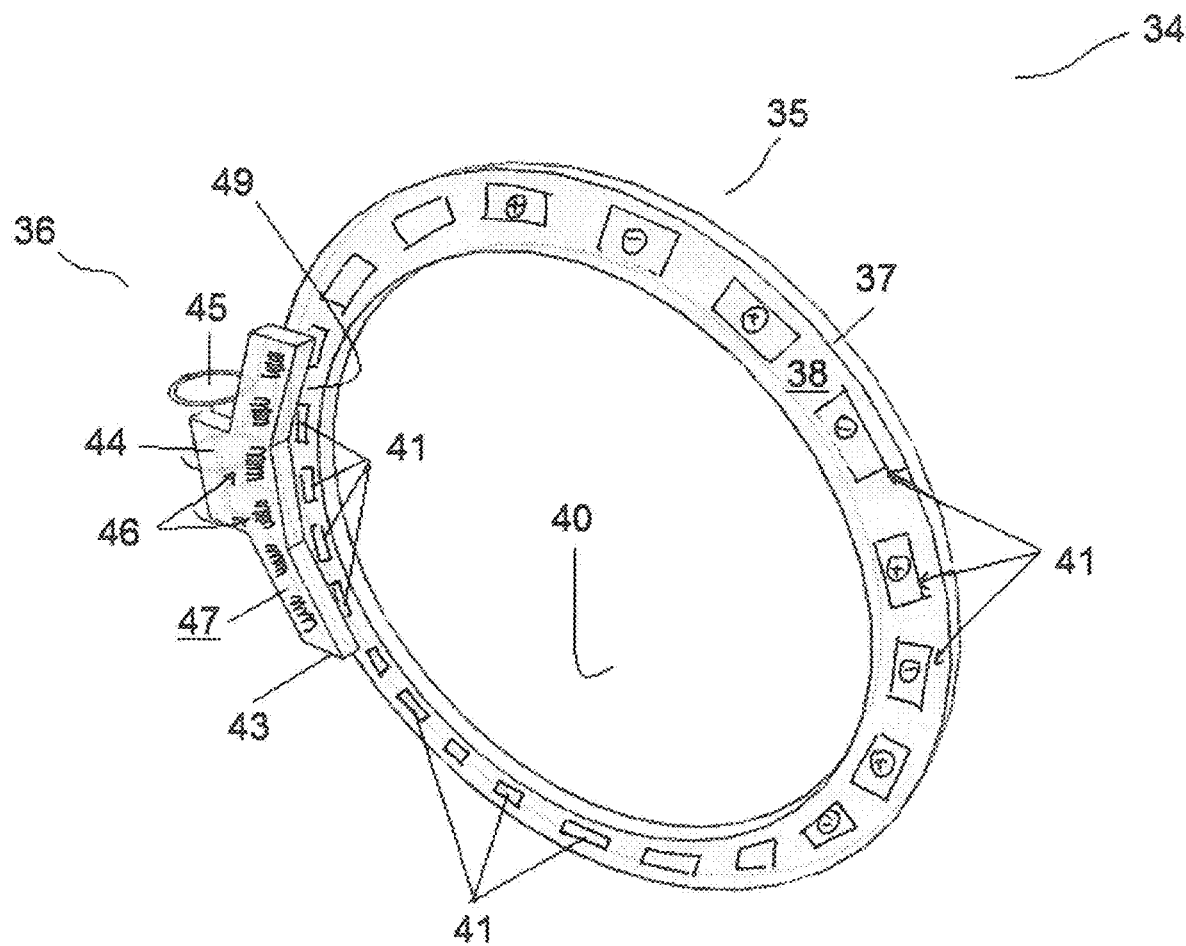
FIG. 2 is a front view of a first embodiment of the present invention for use with the front or rear wheel of the bicycle of FIG. 1.
Figure 3:
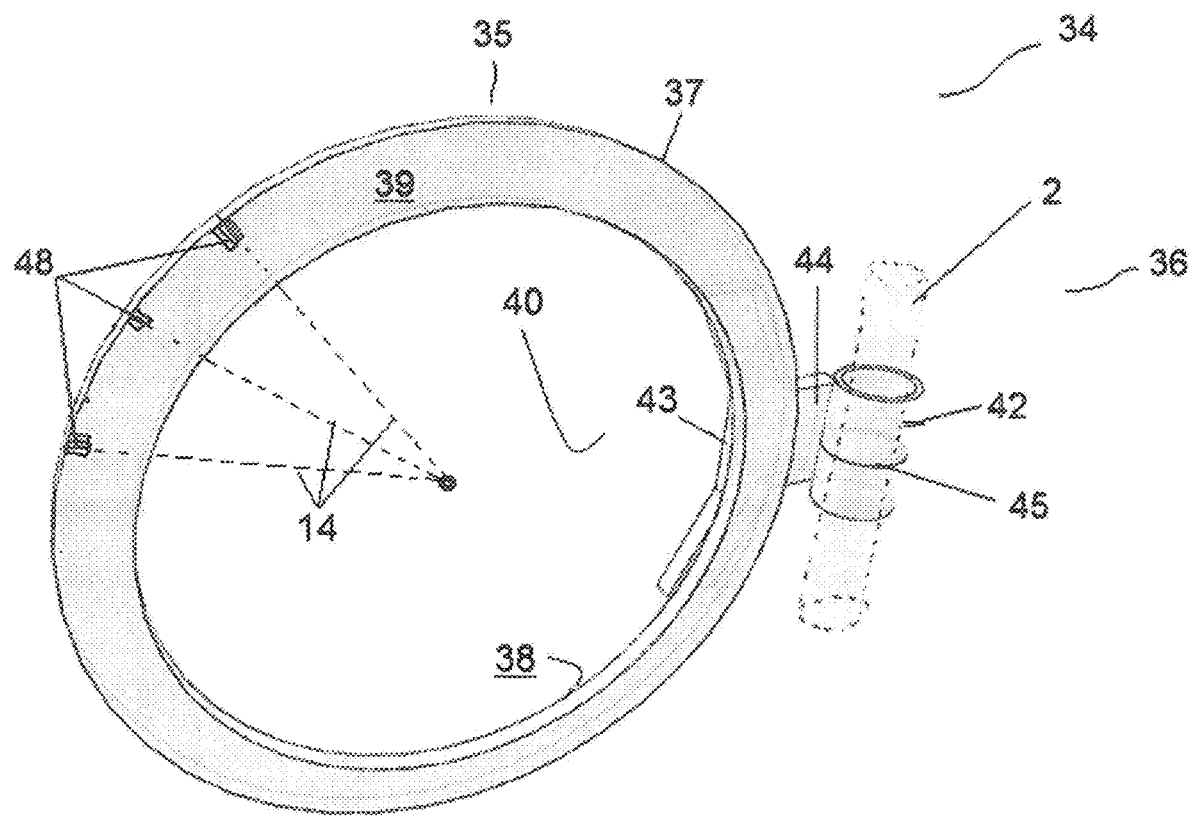
FIG. 3 is a back view of the first embodiment of FIG. 2 installed for use on the bicycle of FIG. 1, with a portion of the frame and spokes shown in phantom.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

The present invention comprises an electric power-assist drive assembly for a spoked-wheeled vehicle. In one embodiment, the invention comprises a electric power-assist drive assembly for propelling a vehicle comprising a frame and at least one spoked wheel, the power-assist drive assembly comprising: a rotatable driving ring supporting a plurality of magnets and mountable to the wheel; a stationary stator supporting a plurality of electromagnets and mountable to Die frame proximate to the wheel for overlapping the electromagnets and the magnets; and a control assembly mountable to the frame, stator, or any pan of the vehicle for delivering electric energy to the stator to rotate the driving ring; wherein rotation of the driving ring propels rotation of the wheel.

As used herein, the term "electric power-assist" broadly refers to the supplementation or replacement of manual effort needed to operate a spoked-wheeled vehicle using electricity. As used herein, the term "spoked-wheeled vehicle" refers to any type of vehicle having at least one spoked wheel including, hut not limited to, a bicycle, unicycle, tricycle, cycle rickshaw, wheelchair, and the like. As used herein, the term "spoked-wheeled" refers to a vehicle having a plurality of rods radiating front the center of at least one wheel (the hub where the axle connects), connecting the hub with the round traction surface.

As an example, the present invention is described in the context of use with a bicycle (1). As used herein, the term "bicycle" refers to a vehicle generally including a frame, two wheels, handlebars, a seat, and pedals. Although the bicycle may comprise these components as are known to those skilled in the art, the particular configuration, size, shape, and type of bicycle are not limitations of the present invention. The term is meant to include any type of bicycle including, but not limited to, a bike, cycle, two-wheeler, mountain bike, ten-speed, racing bike, recumbent bike, stationary exercise bike, and the like.

The typical components of a bicycle and their operation are commonly known to those skilled in the art and will not be discussed in detail, but are summarized briefly as follows since reference will be made to specific components of the bicycle when describing the present invention herein. As shown in FIG. 1, a typical bicycle (1) generally includes a frame (2), a pair of wheels (3, 4), a front set (5), a saddle assembly (6), a pedal assembly (7), and a chain assembly (8).

The frame (2) comprises a top tube (9), a down tube (10), a seat tube (11), a seat stay (12), and a chain stay (13). The frame (2) may be formed of tubular steel, steel or aluminum alloys, or carbon-fiber composites, and is configured to distribute the weight of the user between the front and rear wheels (3, 4). In addition, the frame (2) supports the pair of wheels (3, 4), the front set (5), the saddle assembly (6), the pedal assembly (7), and the chair, assembly (8), all of which are connected to the frame (2) by suitable attachment means known to those skilled in the art.

The pair of wheels consists of a front wheel (3) and a rear wheel (4) which are positioned in tandem and mounted within the frame (2). Each of the front and rear wheels (3, 4) are configured to distribute the weight of the user, and comprise a plurality of spokes (14) connected between a hub (15) and a rim (16) to prevent the wheels (3, 4) from buckling under the w eight of the user; a tire (17) positioned on the perimeter of the rim (16) and comprising an inner tube (not shown) inflatable with air, and a valve (18) through which the air is pumped to inflate the inner tube of the tire (17).

The front set (5) is positioned above the front wheel (3) and comprises handlebar grips (19) for steering the bicycle (1), a head tube (20), a shock absorber (21), front brakes (22) and a fork (23) which holds the front wheel (3) to the frame (2).

The saddle assembly (6) comprises a saddle (24) for seating the user, and a seat post (25) for securing the saddle assembly (6) to the frame (2).

The pedal assembly (7) comprises a pair of pedals (26) and a crank arm (27), and is operably connected to the chain assembly (8). The chain assembly (8) comprises a front derailleur (28), a chain (29), chain rings (30), rear brakes (31), a cogset (32), and a rear derailleur (33).

The invention will now be described having reference to the accompanying Figures. The electric power-assist drive assembly (34) of the present invention (FIGS. 2-6C) is used for engagement with the frame (2) and either the front or rear wheel (3, 4) of the bicycle (1) of FIG. 1. When installed on the bicycle (1), the drive assembly (34) enables a user to propel the bicycle by supplementing or replacing the manual effort normally needed to operate the bicycle (1). The drive assembly (34) is shown generally in FIGS. 2-6C to include a rotatable driving ring (35), a stationary stator (36), and a control assembly (not shown).

Figure 4:
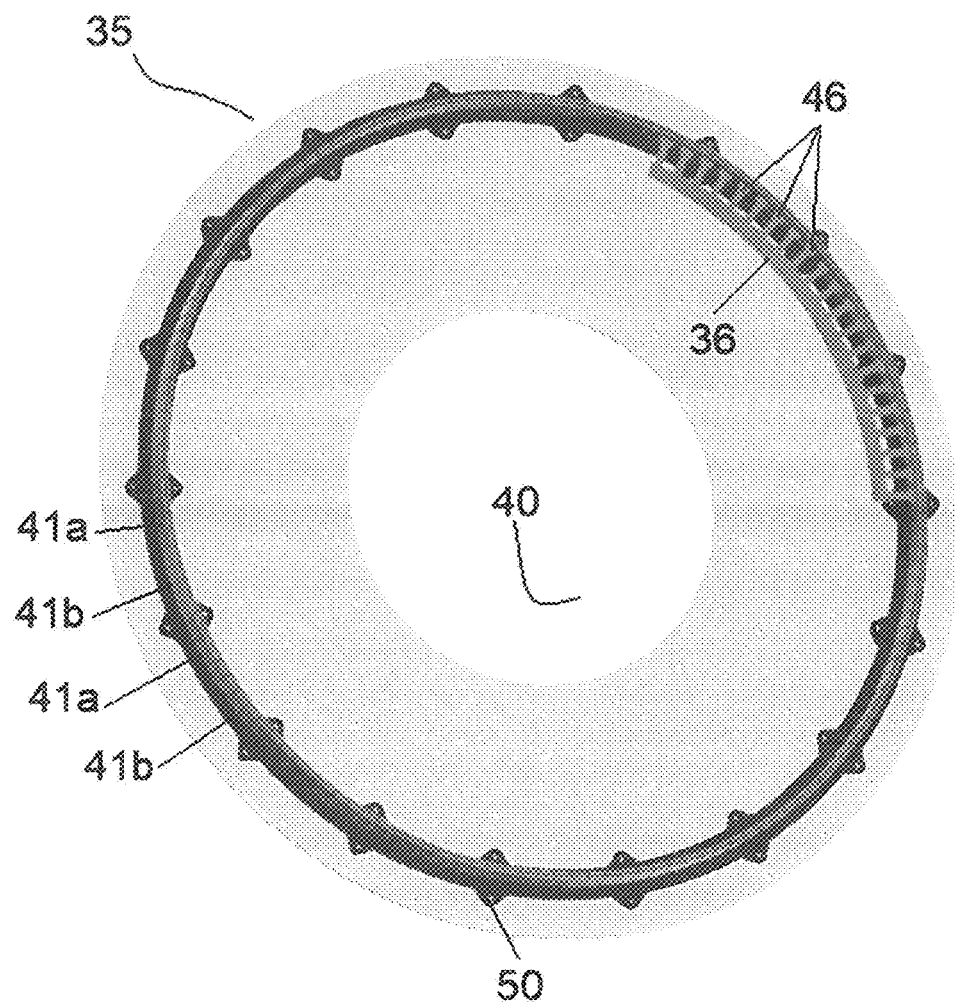
FIG. 4 is a front view of a second embodiment of the present invention for use with the front or rear wheel of the bicycle of FIG. 1, including a single stator.
Figure 5:
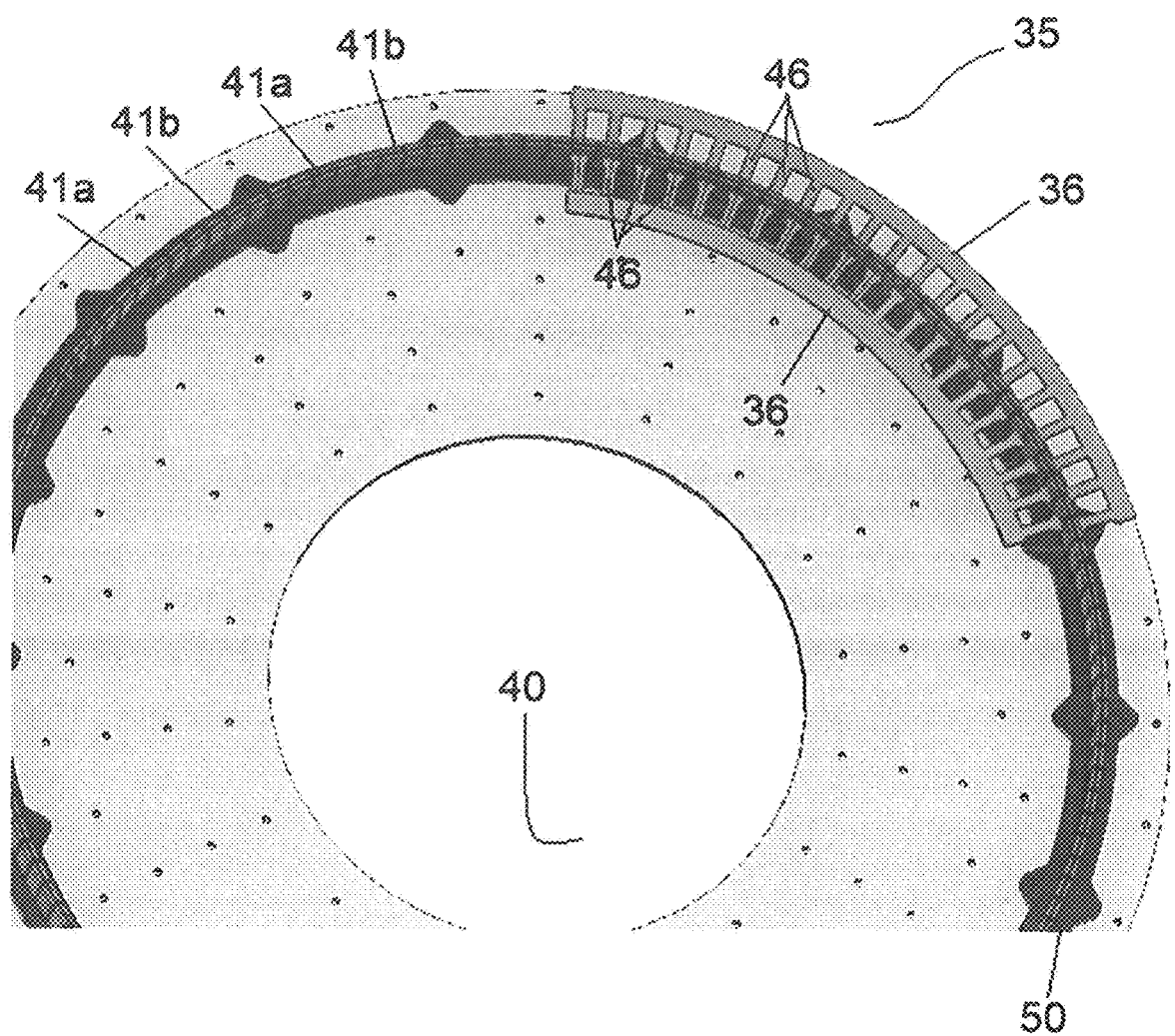
FIG. 5 is a front view of a third embodiment of the present invention for use with the front or rear wheel of the bicycle of FIG. 1, including a pair of stators.
Figure 6A:
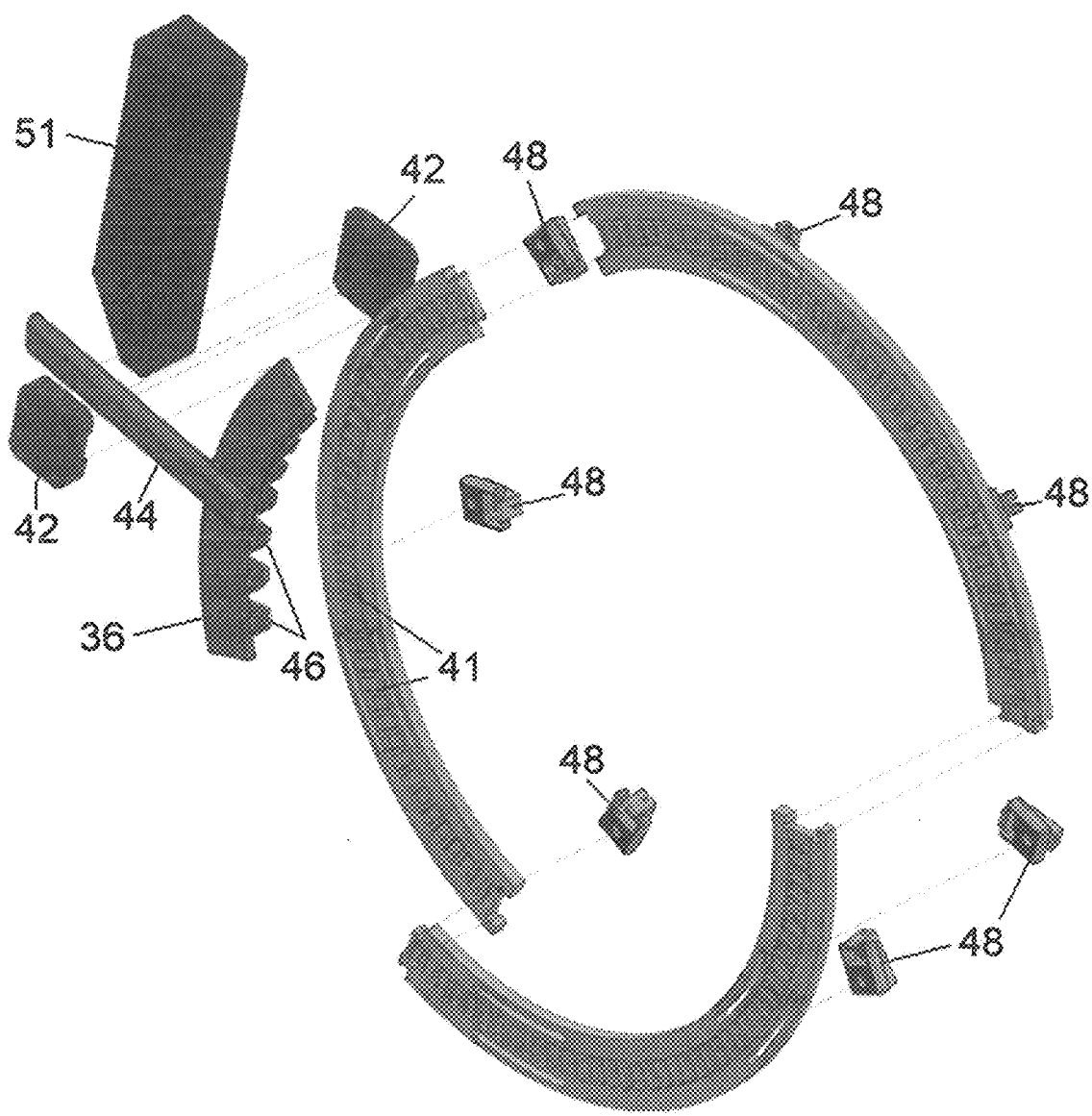
FIG. 6A is a front exploded view of a fourth embodiment of the present invention unassembled for use with the front or rear wheel of the bicycle of FIG. 1.
Figure 6B:
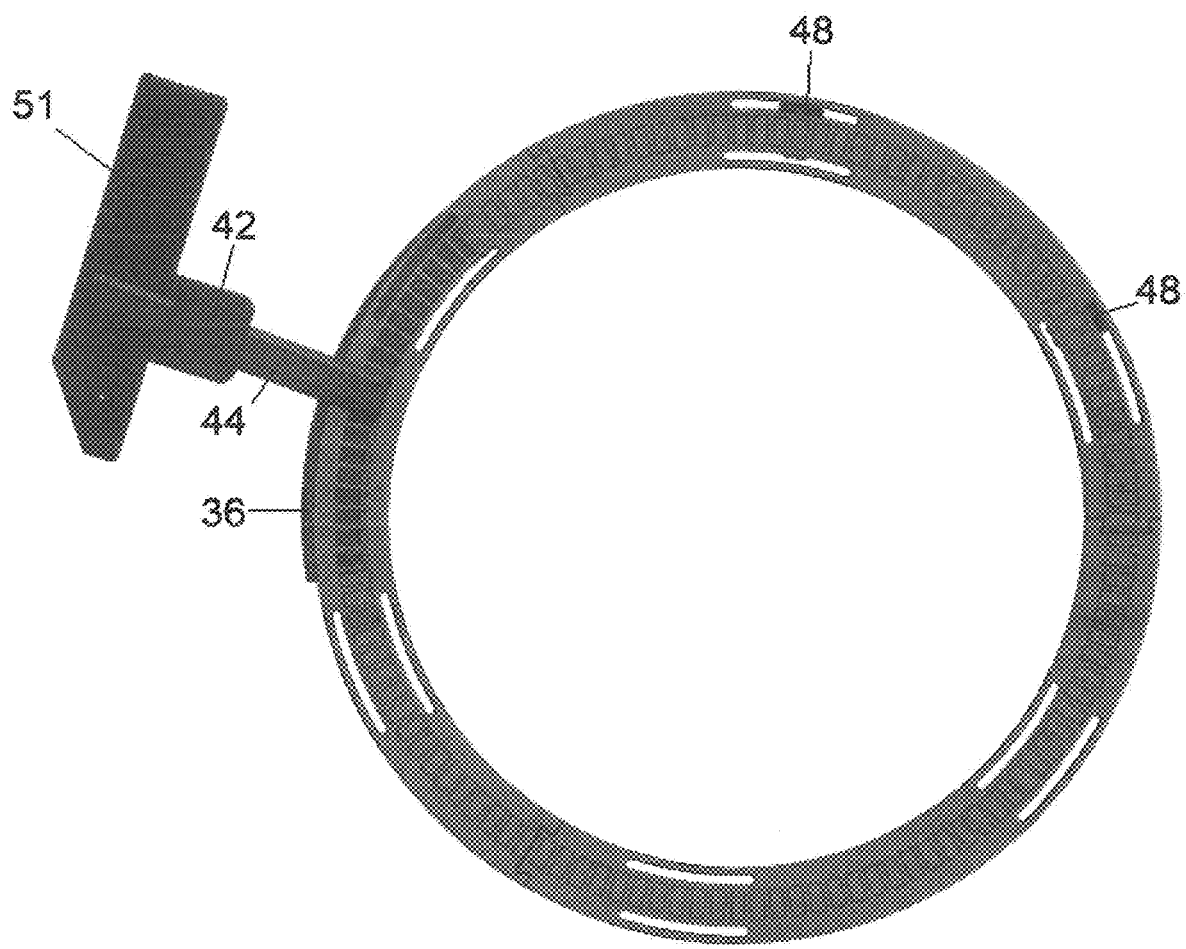
FIG. 6B is a back view of the fourth embodiment of FIG. 6A assembled for use with the front or rear wheel of the bicycle of FIG. 1.
Figure 6C:
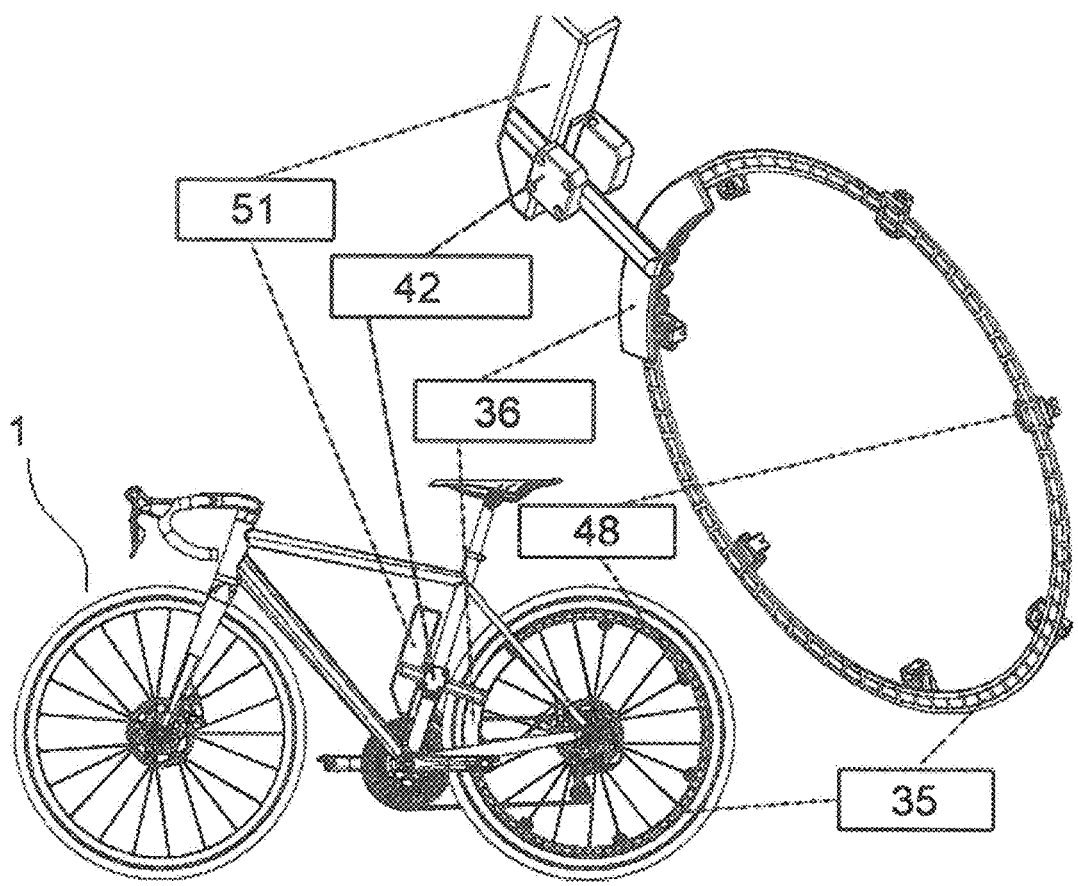
FIG. 6C is a front view of the fourth embodiment of FIG. 6B shown assembled and mounted on the rear wheel of the bicycle of FIG. 1.

The driving ring (35) is generally ring-shaped and comprises an annular rim portion (37) having a front surface (38) and a back surface (39), and defining a central opening (40). The driving ring (35) supports a plurality of magnets (41). In one embodiment, the front surface (38) comprises a supportive base (50) positioned on the from surface (38) for supporting a plurality of magnets (41) (FIGS. 4 and 5). As used herein, the term "magnet" refers to a permanent magnet or an object made from a material that is magnetized and creates its own persistent magnetic field. Ft can attract other ferromagnetic materials such as, for example, iron, or an opposite magnetic field created by permanent magnets or electromagnets. The magnet has two surfaces, each having opposing polarity (i.e., + on one surface, − on the other surface). The magnets (41) are disposed either within the rim portion (37) or over the front surface (38) of the rim portion (37). The magnets (41) are positioned to be evenly distributed or spaced apart in a predetermined pattern, in one embodiment, adjacent magnets (41) are oriented to have opposite polarities (for example, "+−+−+"). In one embodiment, magnets (41) are oriented to have opposite polarities in groups, not necessarily alternating per magnet (for example, two per group as in "++−−++−−"; three per group as in "+++−−−+++−−−" as shown in FIGS. 4 and 5 with "+" magnet groups designated as "41a" and "−" magnet groups designated as "41b"). It will be appreciated that other predetermined patterns of magnets (41) may also be utilized. The number of magnets (41) may vary. In one embodiment, the driving ring (35) has an even number of magnets (41).

In one embodiment, the magnets (41) are disposed within at least a portion of the rim portion (37), preferably within the entirety of the rim portion (37). In one embodiment, the magnets (41) are evenly distributed or spaced in a predetermined pattern within at least a portion of the rim portion (37), preferably within the entirety of the rim portion (37).

In one embodiment, the magnets (41) are disposed on at least a portion of the front surface (38) of the rim portion (37), preferably on the entirety of the from surface (38) of the rim portion (37). In one embodiment, the magnets (41) are evenly distributed or spaced in a predetermined pattern on at least a portion of the front surface (38) of the rim portion (37), preferably on the entirety of the front surface (38) of the rim portion (37).

The back surface (39) or the annular rim portion (37) of the driving ring (35) comprises fastening means (48) for attaching the driving ring (35) to the front (3) or back (4) wheel (FIGS. 3, 6A-C). In one embodiment, the driving ring (35) is attached to the back wheel (4). The driving ring (35) is attached to the spokes (14) on either side of the wheel (3, 4) using suitable fastening means (48) including, but not limited to, hooks, clips, adhesives, and the like. In one embodiment, the fastening means (48) comprise hooks.

The central opening (40) is provided to avoid obstruction of the spokes (14), axis (32, 15), seat stay (12), chain stay (13), and front fork (23) of the wheel (3, 4).

The dimensions of the driving ring (35) are not essential to the invention and may be increased or decreased as may be required to satisfy any particular design objectives. In one embodiment, the driving ring (35) has a diameter which is less than the diameter of the wheel rim (16) in order that the driving ring (35) may be positioned within the wheel rim (16) when attached to the spokes (14) of the wheel (3,4).

In one embodiment, the driving ring (35) is provided in the form of multiple separate pieces. The user can assemble the driving ring (35) by attaching the multiple pieces forming the driving ring (35) onto the spokes (14) of the wheel (3,4).

The stator (36) comprises a plate (43), a neck (44), and mounting means (45). The plate (43) is substantially curved or "C-shaped" to be generally complementary with the configuration of the driving ring (35). The plate (43) supports a plurality of electromagnets (46). As used herein, the term "electromagnet" refers to a type of magnet for which the magnetic field is produced by an electric current. The electric field may change direction or disappears when the current changes direction or disappears respectively. An electromagnet comprises an insulated wire wound into a coil. In one embodiment, a single stator (36) is positioned on the inner circumference of the driving ring (35) (FIG. 4). In one embodiment, a pair of stators (36) is provided, wherein a first stator (36) is positioned on the inner circumference of the driving ring (35) and a second stator (36) is positioned on the outer circumference of the driving ring (35) (FIG. 5). In the embodiments shown in FIGS. 4 and 5, the magnets (41a, 41b) stand "upright" or perpendicularly to front surface (38) of the driving ring (35). In the embodiments shown in FIGS. 2 and 3, the magnets (41) lie "flat" on the front surface (38) of the driving ring (35).

The electromagnets (46) are disposed either within the plate (43) or on the top surface (47) of the plate (43). The electromagnets (46) are positioned to be evenly distributed or spaced apart, relative to the arrangement of the magnets (41) on the driving ring (35). The electromagnets (46) on the stator (36) are positioned to be close to the magnets (41) of the driving ring (35) to maximize efficiency. The closer the magnets (41) and electromagnets (46) are positioned, the stronger the magnetic field interaction and subsequent electro-mechanical energy transfer. In one embodiment, the coils of the electromagnets (46) are oriented towards the driving ring (35), such that the direction of the magnetic field from the coil is perpendicular to the driving ring (35) parallel to the magnetic field from the permanent magnet (41) in the driving ring (35). The number of electromagnets (46) may vary.

In one embodiment, the electromagnets (46) are disposed within at least a portion of the plate (43), preferably within the entirety of the plate (43). In one embodiment, the electromagnets (46) are evenly distributed or spaced within at least a portion of the plate (43), preferably within the entirety of the plate (43).

In one embodiment, the electromagnets (46) are disposed on at least a portion of the top surface (47) of the plate (43), preferably on the entirety of the top surface (47) of the plate (43). In one embodiment, the electromagnets (46) are evenly distributed or spaced on at least a portion of the top surface (47) of the plate (43), preferably on the entirety of the top surface (47) of the plate (43).

The neck (44) extends from the plate (43) to connect the plate (41) to the mounting means (45). The mounting means (45) removably attaches the suitor (36) to a portion of the frame (2) of the bicycle (1) proximate to either the front (3) or rear (4) wheel to which the driving ring (35) has been installed. In one embodiment, the stator (36) is removably attached to a portion of the frame (2) proximate to the rear wheel (4). In one embodiment, the stator (36) is removably attached to the down tube (10) so as to be proximate to the front wheel (3) of the bicycle (1). In one embodiment, the stator (36) is removably attached to the seat tube (11) so as to be proximate to the rear wheel (4). As shown in FIGS. 2, 4, 5, and 6B-C, the stator (36) is positioned to overlap a portion of the driving ring (35) attached to the front (3) or rear (4) wheel, ensuring that the electromagnets (46) concomitantly overlap the magnets (41).

Any mounting means (45) which removably attaches the stator (36) to a portion of the frame (2) may be suitable. Various mounting means (45) can be used including, but not limited to, nuts, bolts, nails, screws, posts, rivets, hinges, clamps, clips, brackets, or any other fasteners commonly used in construction.

In one embodiment, the mounting means (45) comprise a tubular coupling structure. The tubular coupling structure is formed of a pair of generally semi-tubular clamp members which are adapted to fit around a tubular portion of tire frame (2). In one embodiment, the inner circumferential surfaces of the two clamp members are adapted to fit closely about and in contact with the outer circumferential surface of either the down tube (10) or the seat lube (11). The clamp members may be joined together to form the tubular coupling structure by appropriate fastening means (42) including, but not limited to, nuts, bolts, nails, screws, posts, and rivets, or may be hinged or spring-loaded to open and close automatically around the down tube (10) or the seat tube (11).

It will be understood by those skilled in the art that if desired, the mounting means (45) can permanently attach the stator (36) to a portion of the frame (2) by welding or other techniques if the stator (36) is to be used regularly or solely with a particular bicycle (1).

A seal element (not shown) may be positioned between the tubular coupling structure and the down tube (10) or the seat tube (11) in order to provide friction, ensuring that the tubular coupling structure maintains a desired immovable position and does not slip or slide down the down tube (10) or the seat tube stator (11) during rotation of the driving ring (35).

Alternatively, a temporary or permanent adhesive coating (not shown) may be applied between the tubular coupling structure and the down tube (10) or the seat tube (11) in order to ensure that the tubular coupling structure remains immovable and does not slip or slide down the down tube (10) or the seat tube (11) during rotation of the driving ring (35), Suitable adhesive coatings include, but are not limited to, epoxy, glue, and the like.

It will be noted that when the driving ring (35) and stator (36) are installed on the frame (2) of the bicycle (1), a gap (49) is maintained between the stator 36) and the driving ring (35) to allow suitable clearance between the stator (36) and the driving ring (35), thereby ensuring that the driving ring (35) is able to rotate freely without impacting or hitting against the stator (36). The gap (49) may be adjustable, and may be increased or decreased as may be required using the desired configuration of mounting means (45). The gap (49) between the stator (36) and the driving ring (35) has a distance which is sufficiently large to prevent the stator (36) and driving ring (35) from impacting each other, and sufficiently small to allow efficient transfer of the electric field generated by the electromagnets (46) of the stator (36) to the magnets (41) of the driving ring (35). In one embodiment, the gap (49) may have a distance ranging from about 1 mm to about 10 mm, preferably limn about 3 mm to about 5 mm.

The configuration and operation of control assemblies is commonly known to those skilled in the art and will not be discussed in detail. A typical control assembly (not shown) comprises a user controller, an electrical speed controller, a battery (51) (FIGS. 6A-C), and connection means to the stator (36). In one embodiment, the electrical speed controller comprises a general electrical speed controller commonly used for a brushless motor, and which controls the motor by inputting patterned electricity input signals, as are well known to those skilled in the art. Non-limiting examples of connection means may include, but are not limited to, wires, cables, and the like. In one embodiment shown for example in FIG. 6C, a battery (51) and user controller (not shown) which is mounted to fastening means (42) may be operatively connected by suitable connection means (not shown) including, but not limited to, wires, cables, and the like. It will be appreciated that other arrangements of the battery (51), user controller (not shown), and connection means may be used to mount the control assembly on the bicycle (1).

It will be appreciated that the drive assembly (34) of the present invention is simple but rugged in construction that it can be made at low cost. The drive assembly (34) may be easily fabricated. The dimensions of the driving ring (35) and stator (36) are not essential to the invention and are dictated by the various sizes, dimensions, and shapes of the wheel (3, 4). The sizes, dimensions, and shapes may be increased or decreased as may be required to satisfy any particular design objectives.

The driving ring (35) and stator (36) can be constructed from any material or combination of materials having suitable properties such as, for example, mechanical strength, ability to withstand cold and adverse outdoor conditions, rust resistance, corrosion resistance, and ease of machining. The driving ring (35) and stator (36) may be formed of non-magnetic conductive materials including, but not limited to, plastic, wood, or other suitable materials known to those skilled in the art. Such materials are substantially strong and rigid to maintain their form.

The stator (36) may be formed as a single, integral unit combining the plate (43), neck (44), and mounting means (45). The magnets (41), fastening means (42, 48), and electromagnets (46) may be manufactured separately as components which are attachable to the driving ring (35) or stator (36) accordingly. For example, the magnets (41) or electromagnets (46) may be attached to the driving ring (35) or stator (36) respectively by being placed into holders formed of non-conductive material and positioned on the driving ring (35) or stator (36). In general, the drive assembly (34) requires few components, making the drive assembly 34 amenable to rapid assembly and minimizing expense in manufacturing. Electromagnets (46), magnets (41), and components of the control assembly (not shown) are commercially available. The user controller, electrical speed controller, and battery may be packaged or manufactured as a single unit (such as, for example, a control box comprising the user controller, electrical speed controller, and battery).

As described above, the invention may thus be used as an accessory or "add-on" for a bicycle (1), thereby converting a normally user-propelled bicycle to an electrically-operated bicycle. However, in another embodiment, the invention comprises a spoked-wheeled vehicle including the above electric power-assist drive assembly (34). The spoked-wheeled vehicle, for example a bicycle (1), may be manufactured as known to those skilled in the art to include the various components as shown in FIG. 1, and the drive assembly (34) already completely installed on the bicycle (1).

In one embodiment, the invention comprises a method of propelling a vehicle comprising a frame and at least one spoked wheel using the above electric power-assist drive assembly comprising the steps of: mounting the driving ring supporting the plurality of magnets to the wheel; mounting the stationary stator supporting the plurality of electromagnets to the frame proximate to the wheel to overlap the electromagnets and the magnets: mounting the control assembly to the frame; and operating the control assembly to deliver electric energy to the stator to rotate the driving ring, wherein rotation of the driving ring propels rotation of the wheel.

Since the drive assembly (34) is conveniently light and portable for use with any type of bicycle (1), the installation and use of the drive assembly (34) to propel the bicycle (1) can be performed easily by a single user. During installation if the front wheel (3) is selected, the front wheel (3) is detached from the fork (23) of the bicycle (1). The driving ring (35) is attached to the spokes (14) of the front wheel (3) using the fastening means (48). The front wheel (3) with the attached driving ring (3S) is then re-attached to the fork (23) of the bicycle (1). The stator (36) is then attached to the front fork (23) so as to be proximate to the front wheel (3). Alternatively, if the rear wheel (4) is selected, the rear wheel (4) is detached from between the seat stay (12) and the chain stay (13). The driving ring (35) is attached to the spokes (14) of the rear wheel (4) using the fastening means (48). The rear wheel (4) with the attached driving ring (35) is then re-attached between the seat stay (12) and the chain stay (13). The stator (36) is then attached to the seat tube (11) so as to be proximate to the rear wheel (4).

In one embodiment, the driving ring (35) may be provided in the form of multiple separate pieces. The user can assemble the driving ring (35) by attaching the multiple pieces forming the driving ring (35) onto the spokes (14) of the wheel (3, 4). The user thus does not have to remove either the front (3) or rear (4) wheels to attach the driving ring (35), and can simply rotate the selected wheel (3, 4) to attach each piece. The pieces may be connected together by suitable linkages.

The control assembly (for example, in the form of a control box) may be secured to a portion of the frame (2) of the bicycle (1) within convenient reach of the user when he is seated on the saddle (24) of the bicycle (1). For example, the control assembly may be positioned on the handlebar grips (19), the head tube (30), the top tube (9), or the seat post (25).

Once the driving ring (35), stator (36), and control assembly have been installed as described above on the bicycle (1), the user is ready to sit on the saddle (34) and use the control assembly to operate the bicycle (1). In operation, the user controller of the control assembly allows the user to activate or deactivate (i.e., turn "on" to activate, or turn "off" to deactivate using a switch) the electrical speed controller which is powered by the battery and supplies electrical control signals to the stator (36) through the connection means which may include, but are not limited to, wires, cables, and the like.

The electromagnets (46) of the stator (36) convert the electrical control signals into mechanical energy or movement through the magnets (41) of the driving ring (35), causing the driving ring (35) to rotate. The electrical speed controller provides the electrical control signals in the form of predetermined patterns of electrical current. In addition, the electrical speed controller controls the electrical control signals which can be varied over time. The electrical current enters the electromagnets (46) of the stator (36) in a pattern. Due to the electrical current, the magnetic field is generated by the electromagnets (46) in the desired pattern (for example, alternating polarity "+−+−+−"). The electromagnetic field generated by the electromagnets (46) reacts with the electromagnetic field generated by the magnets (41). Depending upon their positioning relative to each other, the electromagnets (46) and magnets (41) either attract or repel each other, causing subsequent displacement or rotation of the driving ring (35). While the input pattern of the electrical current may change over time, the driving ring (35) keeps rotating to maintain a constant rotation.

Since the driving ring (35) is attached to the spokes (14) of the wheel (3, 4), rotation of the driving ring (35) causes concomitant rotation of the wheel (3,4), thereby assisting the user to propel the bicycle (1) by supplementing or replacing tire manual effort normally needed to operate the bicycle (1). The user can thus simply rest his feet on the pedals (26). The components of the chain assembly (8) will operate as normal.

To cease propulsion of the bicycle (1), the user deactivates (i.e., turn "off" using a switch) the electrical speed controller to cease the transmission of electrical control signals to the electromagnets (46) of the stator (36), thereby preventing the conversion of electrical energy into mechanical energy through the magnets (41) of the driving ring (35), and stopping rotation of the driving ring (35).

It should be apparent, however, to those skilled in the art that many more modifications besides those already described are possible without departing from the inventive concepts herein. The inventive subject matter, therefore, is not to be restricted except in the scope of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

REFERENCES

All publications mentioned herein are incorporated herein by reference (where permitted) to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Hansen, B. C. Circular rail linear induction motor. U.S. Pat. No. 6,876,122, issued Apr. 5, 2005.

Pong. T. Pulse propelling flat induction motor. U.S. Pat. No. 6,822,369, issued Nov. 23, 2004.

What is claimed is:

1. An electric power-assist drive assembly for propelling a vehicle comprising a frame and at least one spoked wheel, the electric power-assist drive assembly comprising:
    a rotatable driving ring supporting a plurality of magnets and mountable to the wheel;
    a stationary stator supporting a plurality of electromagnets and mountable to the frame proximate to the wheel for overlapping the electromagnets and the magnets, wherein the stator comprises a substantially curved plate supporting the electromagnets disposed either within or on a top surface of the plate, mounting means comprising a tubular coupling structure formed of a pair of semi-tubular clamp members adapted to fit around a tubular portion of the frame for removably attaching the stator to a portion of the frame of the vehicle proximate to the wheel, and a neck extending between the plate and the mounting means; and
    a control assembly mountable to the frame, stator, or any part of the vehicle for delivering electric energy to the stator to rotate the driving ring;
    wherein rotation of the driving ring propels rotation of the wheel.

2. The drive assembly of claim 1, wherein the driving ring is ring-shaped and comprises an annular rim portion having a front surface and a back surface, and defining a central opening.

3. The drive assembly of claim 2, wherein the magnets are:
    either disposed within at least a portion or the entirety of the rim portion; or
    evenly distributed in a predetermined pattern within at least a portion or the entirety of the rim portion, with adjacent magnets or groups of magnets being oriented to have opposite polarities.

4. The drive assembly of claim 2, wherein the magnets are:
    either disposed on at least a portion or the entirety of the front surface of the rim portion; or evenly distributed in a predetermined pattern on at least a portion or the entirety of the front surface of the rim portion, with adjacent magnets or groups of magnets being oriented to have opposite polarities.

5. The drive assembly of claim 2, wherein the back surface or the annular rim portion of the driving ring comprises fastening means for attaching the driving ring to the wheel.

6. The drive assembly of claim 1, wherein the electromagnets are:
    either disposed within at least a portion or the entirety of the plate; or
    evenly distributed within at least a portion or the entirety of the plate.

7. The drive assembly of claim 1, wherein the electromagnets are:
    either disposed on at least a portion or the entirety of the top surface of the plate; or
    evenly distributed on at least a portion or the entirety of the top surface of the plate.

8. The drive assembly of claim 1, wherein the control assembly comprises an electrical speed controller, a battery, and connection means to the stator, and is positioned on the frame to be within reach of a user.

9. The drive assembly of claim 1, wherein the vehicle comprises a bicycle.

10. The drive assembly of claim 1, wherein the driving ring is in the form of multiple separate pieces.

11. A vehicle comprising an electric power-assist drive assembly of claim 1.

12. The vehicle of claim 11, comprising a bicycle.

13. A method of propelling a vehicle comprising a frame and at least one spoked wheel comprising the steps of:
    providing an electric power-assist drive assembly comprising:
        a rotatable driving ring supporting a plurality of magnets;
        a stationary stator comprising a substantially curved plate supporting a plurality of electromagnets disposed either within or on a top surface of the plate, mounting means comprising a tubular coupling structure formed of a pair of semi-tubular clamp members adapted to fit around a tubular portion of the frame for removably attaching the stator to a portion of the frame of the vehicle proximate to the wheel, and a neck extending between the plate and the mounting means; and
        a control assembly;
    mounting the driving ring supporting the plurality of magnets to the wheel;
    mounting the stationary stator supporting the plurality of electromagnets to the frame proximate to the wheel to overlap the electromagnets and the magnets;
    mounting the control assembly to the frame, stator, or any part of the vehicle; and
    operating the control assembly to deliver electric energy to the stator to rotate the driving ring, wherein rotation of the driving ring propels rotation of the wheel.

* * * * *